(12) United States Patent
Lin et al.

(10) Patent No.: US 8,856,164 B2
(45) Date of Patent: Oct. 7, 2014

(54) SYSTEM AND METHOD FOR PROCESSING ONLINE READING INTERACTIONS

(75) Inventors: Hung-Ju Lin, Taipei (TW); Shi-Chuan Tzeng, Taipei (TW)

(73) Assignee: Chunghwa Telecom Co., Ltd., Taipei (TW)

( * ) Notice: Subject to any disclaimer, the term of this patent is extended or adjusted under 35 U.S.C. 154(b) by 1093 days.

(21) Appl. No.: 12/569,293

(22) Filed: Sep. 29, 2009

(65) Prior Publication Data

US 2010/0217583 A1    Aug. 26, 2010

(30) Foreign Application Priority Data

Feb. 24, 2009   (TW) ................................ 98105785 A

(51) Int. Cl.
*G06F 17/30* (2006.01)
*G06F 17/24* (2006.01)

(52) U.S. Cl.
CPC .................................... *G06F 17/241* (2013.01)
USPC ....................................................... 707/767

(58) Field of Classification Search
None
See application file for complete search history.

(56) References Cited

U.S. PATENT DOCUMENTS

| | | | |
|---|---|---|---|
| 6,302,698 B1 * | 10/2001 | Ziv-El | 434/323 |
| 8,068,780 B2 * | 11/2011 | Cohen | 434/362 |
| 2004/0025111 A1 * | 2/2004 | Park | 715/500 |
| 2006/0041828 A1 * | 2/2006 | King et al. | 715/500 |

* cited by examiner

*Primary Examiner* — Wilson Lee
*Assistant Examiner* — Hung Havan
(74) *Attorney, Agent, or Firm* — Edwards Wildman Palmer LLP; Peter F. Corless; Steven M. Jensen

(57) ABSTRACT

An online reading processing system and method for providing interactive messages to users at end computer devices are provided, which include storing online reading information in a data storage medium; setting the online reading information with a head mark and a tail mark of at least one expert-marked key range by a setting module; reading the information after being set and hiding the head mark and the tail mark thereof; receiving the key range marked by the user; determining whether the user-marked key range covers the head mark and the tail mark so as to form interactive messages according the determination, thereby solving the drawback of failing to provide appropriate feedback or assessment according to users' behaviors as encountered in the prior techniques, and also increasing online reading interaction and enjoyment.

12 Claims, 6 Drawing Sheets

| key point class | matching criterion | tag | score |
|---|---|---|---|
| first class | matching | ●<impA-1-C>○...○</impA-1-C>● | 5 |
| second class | error value = 1 | ○<impsA-2=1>●<impA-2-C>○<impsA-2=1>○...○ </impeA-2=1>○</impeA-2-C>●</impeA-2=1>○ | 4 |
| third class | error value = 2 | ○<impsA-3=2>○<impsA-3=1>● <impA-3-C>○</impsA-3=1>○<impsA-3=2>○... ○</impeA-3=2>○</impA-3=1>○</impsA-3-C>● </impeA-3=1>○</impeA-3=2>○ | 3 |

| key point class | matching criterion | tag | score |
|---|---|---|---|
| first class | matching | ●<impA-1-C>○...○</impA-1-C>● | 5 |
| second class | error value = 1 | ○<impsA-2=1>●<impA-2-C>○<impsA-2=1>○...○</impeA-2=1>○</impeA-2-C>●</impeA-2=1>○ | 4 |
| third class | error value = 2 | ○<impsA-3=2>○<impsA-3=1>●<impA-3-C>○</impsA-3=1>○<impsA-3=2>○...○</impeA-3=2>○</impA-3=1>○</impsA-3-C>●</impeA-3=1>○</impeA-3=2>○ | 3 |

FIG.3

SYSTEM AND METHOD FOR PROCESSING ONLINE READING INTERACTIONS

BACKGROUND OF THE INVENTION

1. Field of the Invention

The invention relates to a method and system for processing online reading interactions, and more specifically, to a system and method for providing interactive messages as a user accesses online reading information at an end device.

2. Description of the Related Art

Reading is an important way to obtain knowledge. Quickly grasping the key points of an article by reading is a desired ability. People often write notes in the margin, make marks, highlight text or draw lines to indicate the range of key points of articles as they try to track the main ideas in books or other printed documents. However, such markup techniques lack an interactive feedback mechanism, and thus a reader has no immediate way of knowing whether or not the demarcated ranges contain the actual key points of the articles. With advances in network technology, articles conventionally printed in papers or books are presented in the form of electronic documents and provided online, but the electronic documents have the same disadvantage of lacking an interactive feedback mechanism as that in the prior printed documents. Such a way of reading is not efficient and doesn't allow quickly and correctly grasping the key points. Furthermore, such a way of reading is a monotonous process that adversely affects the reading experience.

SUMMARY OF THE INVENTION

To solve the disadvantages of the prior art, the present invention provides an online reading processing method and system capable of processing online reading interactions, so as to enhance peoples' interest in reading and to help people grasp the key points of the reading materials both quickly and correctly.

According to an embodiment of the invention, an online reading processing system for providing interactive messages as a user accesses online information at an end device comprises a data storage medium for storing the online reading information; a setting module for setting a head mark and a tail mark of at least one expert-marked key range of the online reading information; a receiving module for reading the online reading information after the setting of and hiding of the head mark and the tail mark therein, and receiving a key range marked by the user; a determining module for determining whether a user-marked key range covers the head mark and/or the tail mark of the at least one expert-marked key range, and thereby forming the interactive messages based on the result of the determination; and a display module for providing the online reading information and the interactive messages.

According to another embodiment of the present invention, an online reading interactive processing method for providing interactive messages as a user performs online reading at an end device comprises storing online reading information in a data storage medium; setting a head mark and a tail mark of at least one expert-marked key range into the online reading information; reading the online reading information after the setting of and hiding of the head mark and the tail mark therein, and receiving a user key range marked by the user; and determining whether a user-marked key range covers the head mark and/or the tail mark in the at least one expert-marked key range, and thereby forming the interactive messages according to the result of the determination.

In contrast to the prior art, the invention provides a method and system for online reading interactive processing to delineate the key positions of online reading information by setting head marks and tail marks in reading materials used in online reading to form the key range therein. Subsequently, it is determined whether the user-marked key ranges cover the expert-marked head marks and the tail marks and the interactive messages are formed according to a result of the above determination. The interactive messages are then fed back to the user immediately via a tag calculation of the head mark and tail mark, without requiring a complicated procedure of word-by-word comparison. The difference between the user-marked key range and the expert-marked key range can be immediately recognized by a user via the interactive messages. Therefore, the aforementioned ways of reading not only enhance the interest in online reading for users, but also increase the ability to quickly and correctly grasp key points of an article present in the form of an electronic document.

BRIEF DESCRIPTION OF THE DRAWINGS

The invention can be more fully understood by reading the subsequent detailed description and examples with reference to the accompanying drawings, wherein:

FIG. 3 is a table of various classes of expert key ranges corresponding to tags and award points according to an embodiment of the present invention.

DETAILED DESCRIPTION OF THE INVENTION

Specific embodiments according to the present invention are described hereinafter to illustrate the present invention. Other advantages or effects of the present invention can be easily appreciated by those with ordinary skill in the art after reading the disclosure of this specification.

Figure 1:
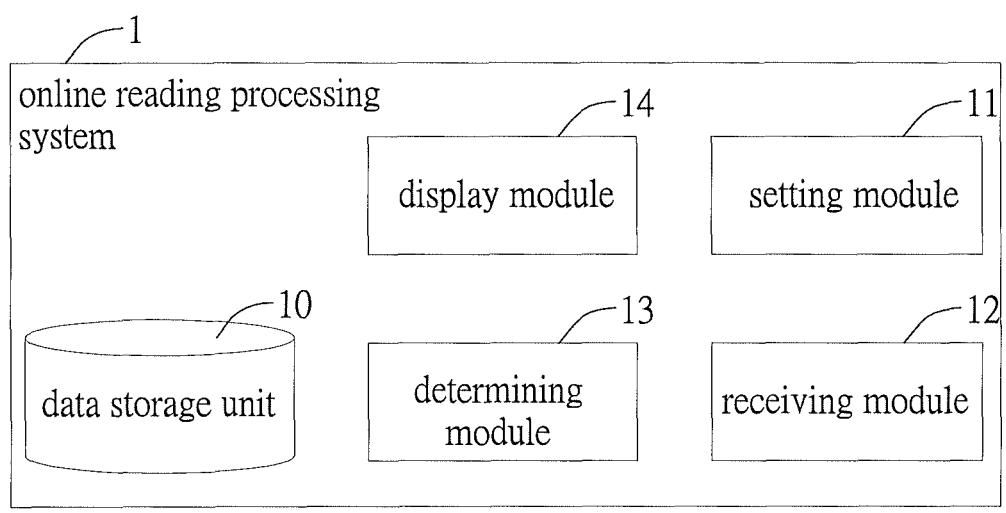
FIG. 1 is a system block diagram of a basic configuration of an online reading processing system according to the present invention.

FIG. 1 is a schematic diagram of a basic structure of an online reading processing system 1 as proposed by the invention. In the embodiment of the invention, the system 1 comprises: a data storage unit 10, a setting module 11, a receiving module 12, a determining module 13 and a display module 14. At a minimum, online reading information that may be displayed on a digital device with a screen, such as a computer, mobile phone or personal digital assistant is stored in the data storage unit. The setting module 11 is for the use of content experts in setting one or more expert-marked key ranges into the online reading information stored in the storage unit 10, each key range individually including a head mark and a tail mark. The receiving module 12 is configured to obtain the expert-marked online reading information from the setting module and hide the head mark and tail mark thereof. The receiving module 12 is also configured to receive the key range that users mark in the online reading information. Users can select any range as a key point in online reading information, e.g., articles. The determining module 13 is configured to determine whether or not the key range covers the head mark and tail mark of the expert-marked key range. Interactive messages are formed according to the result. The interactive messages comprise point information, estimation information or notification information. The display module 14 is configured to display the online reading information and interactive messages. The display module 14 provides the function of prompting users with the number of key ranges and the comparing results from the setting module.

In a preferred embodiment, the display module 14 is a device for displaying the online reading information, for example, the screen of a computer, mobile phone, personal digital assistant and so on. The differences between the user-marked key ranges and the expert-marked key ranges are displayed by the display module 14.

In another preferred embodiment, the determination result is represented in the form of one or more points indicating the degree of correspondence between the user-marked sections and the expert-marked sections. When the display module 14 displays the points on the display interface, the degree of difference and/or differences between the user-marked and expert-marked key ranges can be seen by the users and thus helps users to grasp the key online reading information quickly.

In another preferred embodiment of the present invention applied in conjunction with the Internet, experts, such as key-point markers or questioners, can remotely utilize the setting module 11 to set and modify the expert-marked key ranges, i.e., the ranges with key points, via the Internet.

In another preferred embodiment, the head mark and the tail mark further comprise corresponding word numbers in the expert-marked key range, and determine whether the user-marked key range in the reading covers the head mark and tail mark of expert-marked key range. The difference between the user-marked key range and expert-marked key range is determined immediately via the head marks and tail marks of expert-marked key ranges, whereupon the error information of the reading range is obtained by the determining module.

Figure 2:
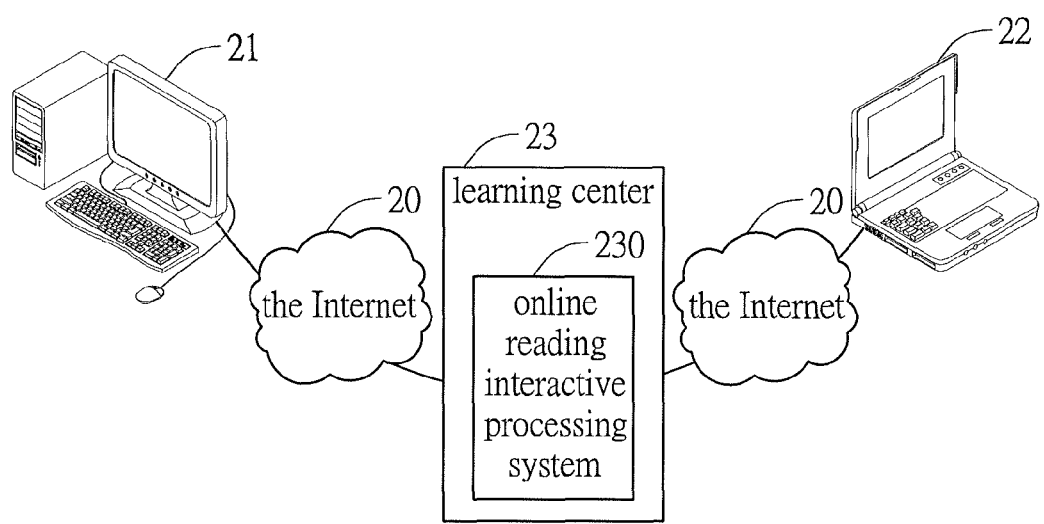
FIG. 2 is a system block diagram of a system for processing online reading interactions according to an embodiment of the present invention.

FIG. 2 is a schematic diagram of a system for processing online reading interactions according to the embodiment. In the embodiment, experts 21 connect to the learning center via the network and log in to the interactive processing system 230. In the interactive processing system 230, one or more experts 21 select the more important ranges as the expert-marked key ranges in the online reading information and decide the classes for the expert-marked key ranges. Then, the interactive processing system 230 forms corresponding head marks, tail marks and an error range according to the settings of the experts. Similarly, users connect to the learning center via the Internet, and log in to the interactive processing system 230. Such users can mark the key ranges in the online reading information when they read the information online. Then, the system 230 can determine the result and generate interactive messages according to the determination result, corresponding interactive messages being displayed via the display module.

In another embodiment, when the interactive processing system 230 is conducted by software that is downloaded to a computer 20, and the reading information has already been set by experts, users can read this information online or offline and the formation of interactive messages is determined by the downloaded software.

In the system of the above embodiment of the present invention, the online reading information that comprises at least one key range with a head mark and a tail mark is stored in the data storage unit. The online reading information with the head mark and tail mark is displayed via the display module. Moreover, users can read the online reading information and select the key range or ranges thereof. Then, the determining module determines whether the user-selected key ranges cover the head mark and tail mark, that is, the associated error range of expert-marked key range or not.

In a preferred embodiment, the key ranges are selected by experts, instructors, key-point markers and the like. The key ranges of the online reading information are selected by using the setting module, wherein the positions of the head mark and the tail mark of the key ranges are indicated by the experts. As such, there are two operating modes in the embodiment of the present invention: a setting key range mode and a reading mode. In the setting key range mode, an expert opens the online reading information and sets one or more expert-marked key ranges. The expert-marked key ranges include the head mark and the tail mark. In the reading mode, a user (i.e., a reader) can set the feedback time for evaluation of the key ranges of the online reading information. There are three modes for the feedback in terms of the timing of the feedback during reading: immediate feedback, delayed feedback and post-view feedback. The immediate feedback mode means that the system immediately determines and displays whether a key range is correct immediately upon the key range being selected by a user. The delayed feedback mode means that the system doesn't determine and display whether a key range is correct until the user begins to select the next key range. The post-view feedback mode means that the system determines and displays whether the selected key ranges are correct all at one time after the reader has finished the online reading and finished selection of all the key ranges the user wishes to select.

FIG. 3 is a table of tags and award points corresponding to different classes of expert key ranges. As shown, an expert sets the classes for a key range, matching criteria, tag position and award points to be obtained. When the expert sets the key range, a class of the online reading information, such as the first to third class shown in the figure, is also designated at the same time. Each of the classes has a determining criterion according to the tolerable error in terms of the number of words between the key ranges of the user and expert. As the marked user range meets a certain determining criterion for the tolerable error for the number of words, a corresponding award of points is obtained. When the key range is set as the first class, the user-marked key range must match the expert-marked key range so as to obtain the associated award points (the maximum award). When the key range is designated as the second class, the user-marked key range must match the expert-marked head mark and tail mark, or be within one word (plus or minus one word), to obtain the associated award points. When the key range is set as the third class, the user-marked key range must match the expert-marked head mark and tail mark, or be within two words (plus or minus two words), to obtain the associated award points.

In the case of the second class or third class, the error tag (the tolerable error) is also considered in addition to the head mark and the tail mark. If a user-marked key range does not include the error tag, points are not awarded. If the user-marked key range covers the error tag near the head mark, whether points are awarded or not depends on if the range includes the error tag of the tail mark or is in a range of the tail mark. For an embodiment of the second class of the expert-marked key range, if the first word of a user-marked key range includes the head mark with an error tag immediately before or after the head mark, the user has no room for making further mistakes such that award points are obtained only if the last word of the user-marked key range exactly matches the tail mark. On the other hand, if the first word of the user-marked key range matches the head mark, the user has a tolerable error of one word such that award points are obtained if the last word matches the tail mark with error tag immediately prior to or after the tail mark.

As shown in the first class, the solid circles include the first word and the last word of the expert-marked key range. The head mark and tail mark are just inside the first word and the last word, respectively, and are formed as a matching pair of text string tags along the lines of XML markup tags. The head mark includes the setting tag <imp A−1−C> and the tail mark includes the setting tag </imp A−1−C>, wherein letter A represents the symbol of the expert key range and indicate the head mark and tail mark of different expert key ranges. Numeral 1 represents the class of the expert key range, and C represents the number of words of the expert key range. Referring to the second class of FIG. 3, an error tag is set in front of the head mark and tail mark or in rear thereof, wherein the error tag of head mark comprises the tag <imps A−2=1>, and the error tag of tail mark includes tag </imps A−2=1>. The error value of 1 represents the tolerable error in terms of the number of words, and the error value of head mark and tail mark is zero. For example, in the case of the second class, when a user sets the key range, the system determines whether or not the range of the head mark and tail mark covers the head mark, the tail mark and the error tags. If it doesn't cover, points are not awarded because the user-marked key range does not match the expert-marked key range. If it does cover, the error value is added. The number of points awarded is 4 if the error value is less than 2, and the award points are lost if the error value is more than 2. For example, the error value is 1 when the user key range is in the error range. Hence, to meet the criteria of the second class, the end of the user-marked key range must cover the tail mark (error value is zero) such that the total error value is less than 2 (i.e., 1+0=1<2). If the end of the user-marked key range falls in the error tag that is placed in front of the tail mark or in back thereof (error value is zero), the error value is equal to 2 (1+1=2), and the user is unable to obtain any award points. Likewise, the rules for determining the error amount are similar for the third class and on up to the Nth class.

Figure 4:
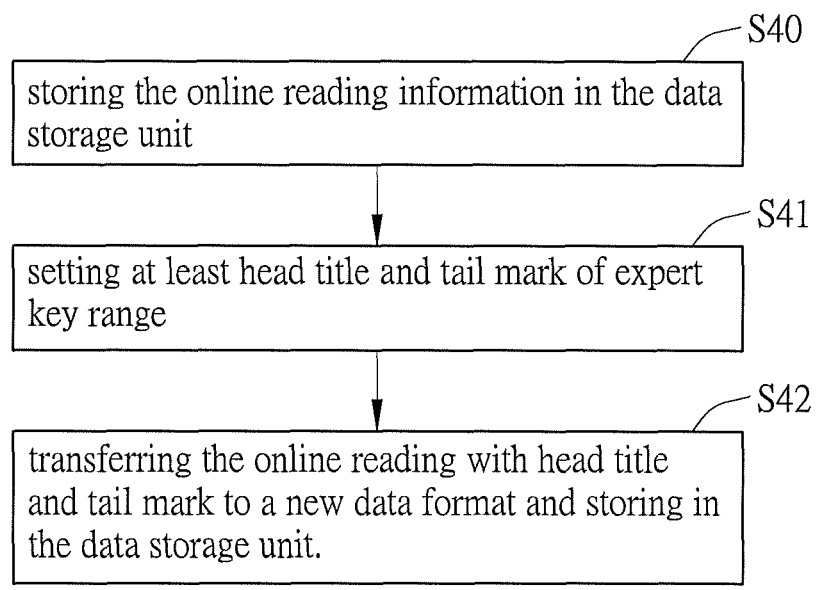
FIG. 4 is a flow chart of setting expert key range in the online reading processing system according to an embodiment of the present invention.

FIG. 4 is a flow chart showing setting the expert-marked key ranges in the online reading processing system. In step S40, the online reading information is stored in a data storage unit. Next, proceed to step S41.

In step S41, the online reading information is set into at least an expert-marked head mark and tail mark. Next, proceed to S42.

In step S42, the online reading information having at least one head mark and tail mark is transferred to a new data format and stored into the data storage unit. In a preferred embodiment, the above-described online reading information can be set with different key ranges by different experts. And anyone can read the expert-marked key ranges in this online reading information.

Figure 5:
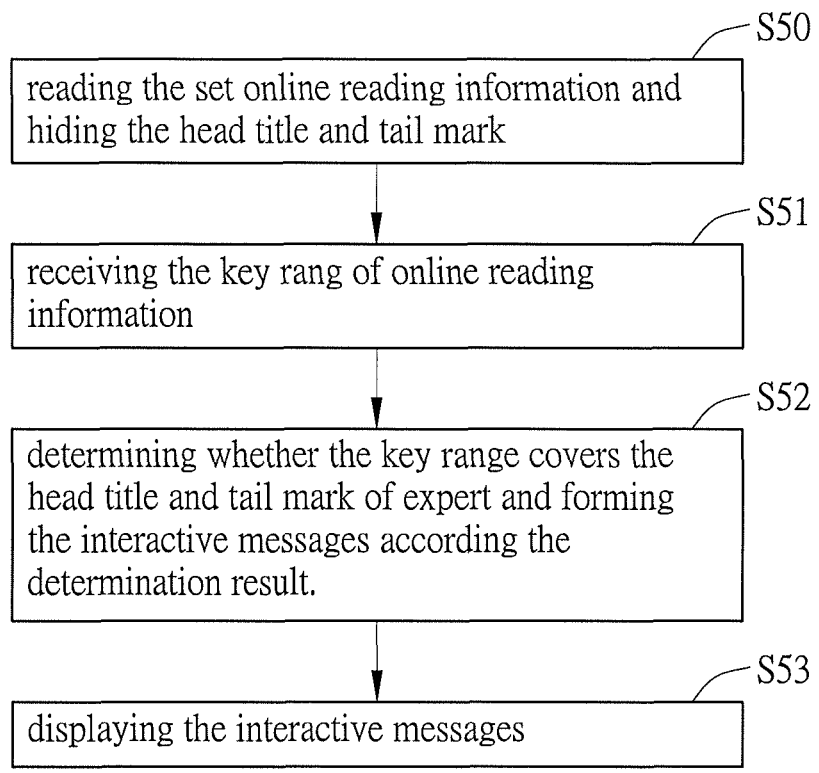
FIG. 5 is a flow chart of the process for determining a key range so as to form interactive messages according to an embodiment of the present invention.

FIG. 5 is a flow chart showing evaluating the user-marked key range to form the interactive message. In step S50, the set online reading information is received by the receiving module and hides the head mark and the tail mark. Next, proceed to S51.

In step S51, the receiving module receives the user-marked key range of the user. Next, proceed to step S52.

In step S52, a determination is made as to whether the user-marked key range covers the expert-marked head mark and tail mark, in order to form interactive messages according the result. Next, proceed to step S53.

In step S53, the display module displays the interactive messages.

When a determination is made as to whether the user-marked key range covers the expert head mark and the tail mark, there are two modes: an immediate determining mode and a full-context determining mode. The immediate determining mode means that the system determines the key range and forms the interactive messages when a user is marking the key range. The full-context determining mode means that the system determines the key ranges and gives all award points after a user has marked the key ranges.

Figure 6:
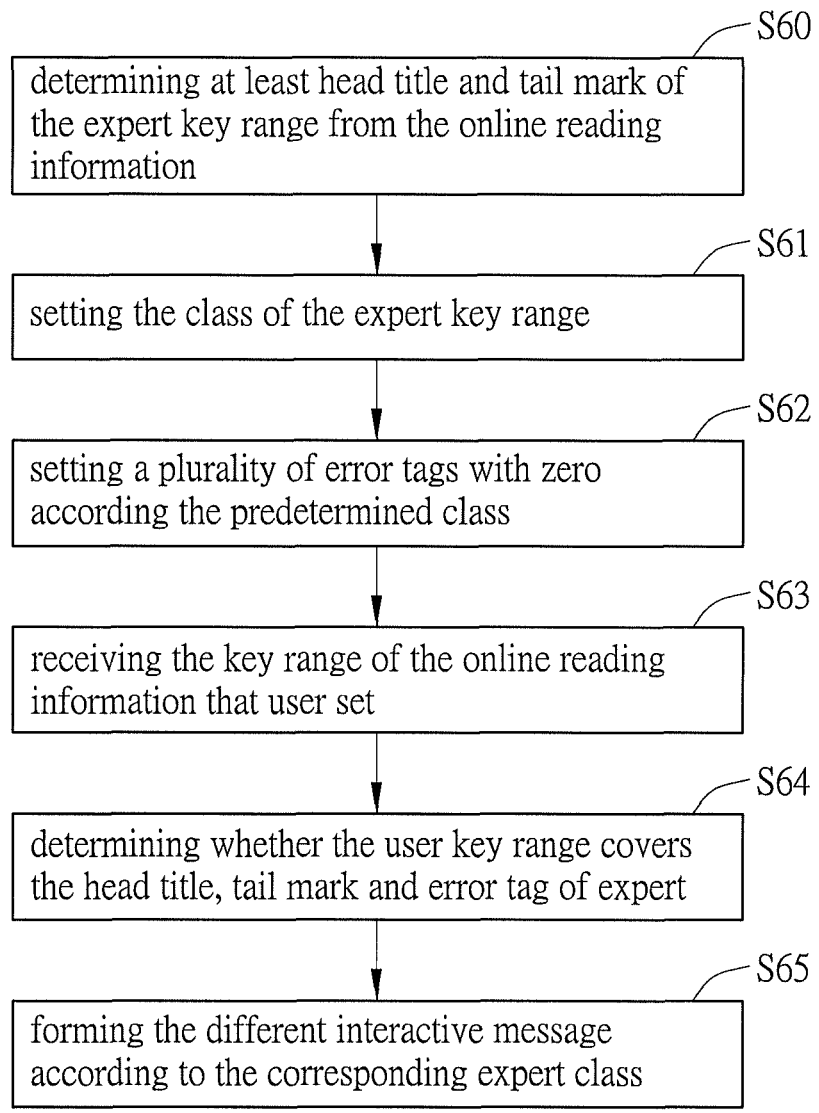
FIG. 6 is a flow chart of the online reading processing system according to an embodiment of the present invention.

FIG. 6 is a flow chart of the online reading processing system according to the embodiment of the invention. In step S60, at least a head mark and a tail mark of the expert-marked key range are formed in the online reading information. Next, proceed to step S61.

In step S61, the classes of the expert-marked key ranges are determined. Next, proceed to step S62.

In step S63, a plurality of error tags including none are set in the predetermined area according to the class of the expert-marked key range. Next, proceed to step S64.

In step S64, whether the user-marked key range covers the head mark and tail mark of the expert-marked key range is determined by the determining module. Next, proceed to step S65.

In step S65, different interactive messages are formed according to the results and the different classes of the expert-marked key ranges.

Given the above, the present invention provides an interactive processing system for online reading. The system according to the present invention determines whether the key range marked by users matches the key range set by experts, and offers an interactive feedback message. With the system, users can expedite their reading and obtain the range of key points quickly and correctly, and thereby enhance the pleasure of reading and reading ability accordingly.

The foregoing descriptions of the detailed embodiments are illustrated to disclose the features and functions of the present invention and are not to be construed as restrictive of the scope of the present invention. It will be understood by those in the art that various modifications and variations can be made according to the spirit and principles of the disclosure of the present invention and still fall within the scope of the appended claims.

What is claimed is:

1. An online reading processing system for providing interactive messages as a user accesses online reading information at an end device, the system comprising:
    a data storage medium for storing the online reading information;
    a setting module for setting a head mark and a tail mark of at least one expert-marked key range into the online reading information, wherein the setting module has a reading mode to set a feedback time for evaluation of the key range of the online reading information, and the feedback time has a delayed feedback mode and a postview feedback mode;
    a receiving module for reading the online reading information after setting and hiding the head mark and the tail mark therein, and receiving at least one user-marked key range from a user;
    a determining module for determining whether a received user-marked key range covers the head mark and/or the tail mark of the at least one expert-marked key range, and thereby forming the interactive messages based on a result of the determination; and a display module for providing the online reading information and the interactive messages, wherein the head mark and the tail mark of the at least one expert-marked key range independently have a plurality of determination values, and the determining module combines the user-marked key range and a determination value of the head mark and/or the tail mark of the at least one expert-marked key range, and thereby determines whether or not to form the interactive messages.

2. The system of claim 1, wherein the display module comprises a function to prompt the number of the at least one expert-marked key range and/or the result of the determining.

3. The system of claim 1, wherein the interactive messages comprise information about award points, prompts and assessment of the user-marked key range.

4. The system of claim 1, wherein at least one error tag is added into a predetermined range prior to the head mark and next to the tail mark, such that the determining module forms the interactive messages based on a user's performance according to the at least one error tag covered by the user-marked key range.

5. The system of claim 1, wherein the head mark and tail mark comprise the corresponding number of words of the at least one expert-marked key range, which are used by the determining module to determine the degree of error for the user-marked key range in the online reading information.

6. The system of claim 5, wherein the error information comprises tolerable erroneous word numbers, erroneous ratios or erroneous assessments between the at least one expert key range and the marked user key range.

7. The system of claim 4, wherein the setting module determines an amount of the at least one error tag in the at least one expert key range according to predetermined classes.

8. An online reading interactive processing method for providing interactive messages as a user performs online reading at an end device, the method comprising:

storing online reading information in a data storage medium;

setting a head mark and a tail mark of at least one expert-marked key range into the online reading information by a setting module, wherein the setting module has a reading mode to set a feedback time for evaluation of the key range of the online reading information, and the feedback time has a delayed feedback mode and a post-view feedback mode, wherein the head mark and the tail mark of the at least one expert-marked key range independently have a plurality of determination values;

displaying the online reading information for a user to read after the setting and hiding the head mark and the tail mark therein, and receiving at least one user-marked key range by the user; and determining whether a user-marked key range covers the head mark and/or the tail mark in the at least one expert-marked key range, and thereby combining the user-marked key range and a determination value of the head mark and/or the tail mark of the at least one expert-marked key range, and determining whether or not to form the interactive messages.

9. The method of claim 8, wherein the setting comprising:

determining the head mark and the tail mark of the at least one expert-marked key range in the online reading information;

selecting a class for the at least one expert-marked key range; and setting from zero to a plurality of error tags within a predetermined range prior to the head mark and next to the tail mark based on the class of the at least one expert-marked key range; and wherein the determining comprises:

determining whether the user-marked key range covers the head mark, the tail mark and/or the error tags in the expert-marked key range; and forming the interactive messages each independently with a corresponding assessment based on the class of the expert-marked key range.

10. The method of claim 8, wherein the interactive messages comprise information about award points, prompts or assessments based on the user-marked key range.

11. The method of claim 8, wherein the head mark and tail mark in the expert-marked key range further comprise the number of words of the at least one expert-marked key range, which are used by the determining module to determine error information for a reading range in the online reading information.

12. The method of claim 11, wherein the error information comprises erroneous word numbers, erroneous ratios, or erroneous assessments between the at least one expert-marked key range and the user-marked key range.

* * * * *